(12) United States Patent
Winzell et al.

(10) Patent No.: US 11,343,447 B2
(45) Date of Patent: May 24, 2022

(54) THERMAL CAMERA HEALTH MONITORING

(71) Applicant: Axis AB, Lund (SE)

(72) Inventors: Thomas Winzell, Lund (SE); Jesper Bengtsson, Lund (SE); Mats Bylander, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/109,520

(22) Filed: Dec. 2, 2020

(65) Prior Publication Data

US 2021/0176411 A1 Jun. 10, 2021

(30) Foreign Application Priority Data

Dec. 5, 2019 (EP) ..................... 19213795

(51) Int. Cl.
*H04N 5/33* (2006.01)
*G01J 5/00* (2022.01)

(52) U.S. Cl.
CPC ............. *H04N 5/33* (2013.01); *G01J 5/0003* (2013.01); *G01J 2005/0077* (2013.01)

(58) Field of Classification Search
None
See application file for complete search history.

(56) References Cited

U.S. PATENT DOCUMENTS

| | | | |
|---|---|---|---|
| 5,151,682 A * | 9/1992 | Marinitsch | B60R 25/10 340/514 |
| 6,683,643 B1 * | 1/2004 | Takayama | H04N 5/367 348/247 |
| 8,908,046 B1 | 12/2014 | Johannesson et al. | |
| 8,964,030 B2 | 2/2015 | Itoh et al. | |
| 9,674,458 B2 | 6/2017 | Teich et al. | |
| 9,948,906 B2 | 4/2018 | Takeuchi | |
| 2005/0029453 A1 | 2/2005 | Allen et al. | |
| 2005/0258367 A1 | 11/2005 | Anderson et al. | |
| 2007/0126869 A1 | 6/2007 | Montminy et al. | |

(Continued)

FOREIGN PATENT DOCUMENTS

| EP | 3062074 A1 | 8/2016 |
|---|---|---|
| GB | 2518224 A1 | 3/2015 |

(Continued)

OTHER PUBLICATIONS

Hollands et al., "Effects of Resolution, Range, and Image Contrast on Target Acquisition Performance," vol. 60 issue: 3, pp. 363-383 (Mar. 5, 2018).

(Continued)

*Primary Examiner* — Stefan Gadomski

(74) *Attorney, Agent, or Firm* — Volpe Koenig

(57) ABSTRACT

Methods and apparatus, including computer program products, for detecting a problem with a thermal camera. A current contrast value is determined for the thermal camera. It is determined whether the current contrast value deviates from a reference contrast value by more than a predetermined value. In response to determining that the current contrast value deviates from the reference contrast value by more than a predetermined value and for more than a predetermined period of time, an indication of a problem with the thermal camera is provided.

10 Claims, 3 Drawing Sheets

(56) References Cited

U.S. PATENT DOCUMENTS

| | | | |
|---|---|---|---|
| 2009/0060369 A1 | 3/2009 | Agarwala et al. | |
| 2009/0273675 A1 | 11/2009 | Jonsson | |
| 2015/0271471 A1 | 9/2015 | Hsieh et al. | |
| 2017/0160140 A1* | 6/2017 | Zhao | G01J 5/028 |
| 2018/0234616 A1* | 8/2018 | Kamat | H04N 5/217 |
| 2019/0101410 A1* | 4/2019 | Kuper | H04W 4/70 |
| 2019/0355138 A1* | 11/2019 | Hall | H04N 13/204 |
| 2020/0028996 A1* | 1/2020 | Feng | G03B 13/36 |
| 2021/0293626 A1* | 9/2021 | Winzell | G01J 5/02 |

FOREIGN PATENT DOCUMENTS

| | | |
|---|---|---|
| JP | 2004-336153 A | 11/2004 |
| JP | 2007-300547 A | 11/2007 |
| JP | 2011-259034 A | 12/2011 |
| JP | 2012-028992 A | 2/2012 |
| TW | 201013172 A | 4/2010 |
| WO | 2017/105846 A1 | 6/2017 |

OTHER PUBLICATIONS

Extended European Search Report dated Jun. 24, 2020 for the European Patent Application No. 19213795.8.
Extended European Search Report dated Jul. 14, 2020 for the European Patent Application No. 19213800.6.
Tomasz Orżanowski, "Modified two-point calibration algorithm for infrared focal plane arrays," Proc. SPIE 10433, Electro-Optical and Infrared Systems: Technology and Applications XIV, 104330J (Oct. 6, 2017).
Communication pursuant to Article 94(3) EPC dated Jul. 29, 2021 for European Patent Application No. 19 213 795.8.

\* cited by examiner

THERMAL CAMERA HEALTH MONITORING

BACKGROUND

The present invention relates to thermal cameras, and more specifically to automatically detecting various types of problems related to a thermal camera.

Thermal cameras are used in a wide variety of monitoring situations. They are often preferable over monitoring cameras that operate in the visible range of the electromagnetic spectrum, as the thermal cameras may operate under essentially any light conditions, ranging from pitch dark to sunlight. They are also less sensitive to different light conditions, such as shadows, backlight, darkness and even camouflaged objects. Even in difficult weather conditions, such as smoke, haze, dust and light fog, thermal cameras generally have very good performance. Further, as thermal cameras do not need floodlights even in complete darkness, they also reduce light pollution and lower energy consumption.

Thermal cameras can detect very small differences in temperature, which makes it more difficult for a human to blend with the background. Therefore, thermal cameras are excellent at detecting humans obscured by complex backgrounds or hidden in deep shadows. In addition, many other types of objects also have a different temperature than the surrounding environment, making detection easy. For at least these reasons, thermal cameras can be used in a wide range of security applications, such as perimeter protection around industrial sites, airports and power plants. Their detection capabilities also make them a valuable tool, for example, in search and rescue operations.

As an example, a live video from a thermal camera can inform a camera operator about a person walking among the cars in a parking lot long before a visual camera would detect the movement. When it comes to identification, it is possible to use thermal cameras in situations where privacy is an issue, such as at schools.

Compared to visual cameras, thermal cameras can provide more reliable detection and shape recognition by combining high image contrast with motion detection. This results in fewer false alarms and reduces unnecessary responses and actions by personnel. The cameras also add thermal information to the image, making it possible to monitor processes and detect abnormal behavior when temperatures change, for example, to find heat leaks in buildings or determine whether a car has been driven within a recent period.

Generally, video captured by thermal cameras is not continuously monitored. Rather, only when an event occurs is the operator alerted and will then determine what the problem may be and take an appropriate action. This means that if a thermal camera is tampered with or accidentally redirected, or if the thermal camera becomes dirty, this may go unnoticed for quite some time and might result in various security and reliability issues. This is particularly relevant for systems that include a large number, say a thousand or so, of monitoring cameras, where it may not be feasible or possible for a camera operator to check the "health" of each camera with sufficient regularity. For at least these reasons, there is a need for better methods for detecting malfunction of a thermal camera.

SUMMARY

A first aspect of the teachings relate to a method, in a computer system 310, for detecting a problem with a thermal camera 340. The method includes:

determining a current contrast value for the thermal camera;

determining whether the current contrast value deviates from a reference contrast value by more than a predetermined value; and in response to determining that the current contrast value deviates from the reference contrast value by more than a predetermined value and for more than a predetermined period of time, providing an indication of a problem with the thermal camera.

This provides a way of automatically detecting whether there is a problem with the thermal camera, such as there being dirt on the lens, a deterioration of the image sensor or a mechanical shutter that is stuck, the camera having been tampered with, etc., and alerting a user about such a problem. This is particularly useful in large surveillance camera systems where it may not be feasible to continuously monitor all cameras manually.

According to one embodiment the problem can be one of: the thermal camera having been tampered with, the thermal camera having been redirected, and the lens of the thermal camera being affected in a way that causes transmission loss. That is, a wide range of different types of problem can be discovered using the techniques described herein. Again, while problems may be easy to detect manually in individual cameras, the risk of undetected camera problems may increase in large systems that may contain hundreds or thousands of cameras, and therefore it is important to have reliable automated methods for detecting camera malfunction.

According to one embodiment, the reference contrast value and the current contrast value can be determined using one of: a Sobel algorithm, a Laplace algorithm, a Michelson contrast algorithm, and an image entropy algorithm. Different types of algorithms may prove more or less useful under certain circumstances, and may require different computational resources, so being able to adapt the algorithm based on the specific situation at hand can make the problem detection efficient and accurate.

According to one embodiment, the reference contrast value is based on a Johnson criterion pertaining to one or more of: detection, recognition and identification of an object having a temperature that differs from the temperature of a homogenous background.

According to one embodiment, the reference contrast value is generated through applying a machine learning process on measured contrast values over a period of time. This allows a time-varying reference contrast value to be used, rather than a fixed one, which may significantly improve the accuracy of the system.

According to one embodiment, the method can include: starting a timer in response to an earliest determination that the current contrast value deviates from the reference contrast value by more than the predetermined value; at regular time intervals, repeating the determination of a current contrast value and the determination of whether the current contrast value deviates from the reference contrast value; and in response to detecting that the current contrast values remain deviant from the reference contrast value by more than the predetermined value and for more than a predetermined period since the timer was started, providing the indication of a problem related to the thermal camera. That is, a timer can be started and reset based on the detected contrast values and how they relate to the predetermined contrast value, and a predetermined period can be set to define at what point an alert should be generated. Using timers in combination with contrast measurements is an easy and computationally low-cost way of determining whether a problem has occurred, or whether there may just have been a temporary issue (e.g., a bird flying past the camera or debris temporarily covering the camera lens) at the time a particular image was taken. There may also be weather-related events, of course, such as dense fog or significant precipitation, that causes the contrast value to drop below a certain threshold without there being any problem with the camera.

According to one embodiment, the regular time intervals range from approximately one to three days. Typically, degradations of thermal cameras do not occur very rapidly, so in general, taking measurements with this type of frequency is sufficient. However, again, this is specific to the particular circumstances at hand. For instance, if the camera is accessible to a potential vandal or if it is mounted in a spot with many birds, it may be useful to set a shorter time interval than if the camera is out of reach and well sheltered.

According to a second aspect, a system for detecting a problem with a thermal camera 340 includes a memory 320 and a processor 330. The memory contains instructions that when executed by the processor causes the processor to perform a method that includes:

determining a current contrast value for the thermal camera;
  determining whether the current contrast value deviates from a reference contrast value by more than a predetermined value; and
  in response to determining that the current contrast value deviates from the reference contrast value by more than a predetermined value and for more than a predetermined period of time, providing an indication of a problem with the thermal camera.

The system advantages correspond to those of the method and may be varied similarly.

According to a third aspect, a thermal camera 340 includes a system 310 as described above, for detecting a problem with the thermal camera. The advantages of the camera correspond to those of the system and may be varied similarly.

According to a fourth aspect, a computer program for detecting a problem with a thermal camera 340 contains instructions corresponding to the steps of:

determining a current contrast value for the thermal camera;
  determining whether the current contrast value deviates from a reference contrast value by more than a predetermined value; and
  in response to determining that the current contrast value deviates from the reference contrast value by more than a predetermined value and for more than a predetermined period of time, providing an indication of a problem with the thermal camera.

The computer program involves advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
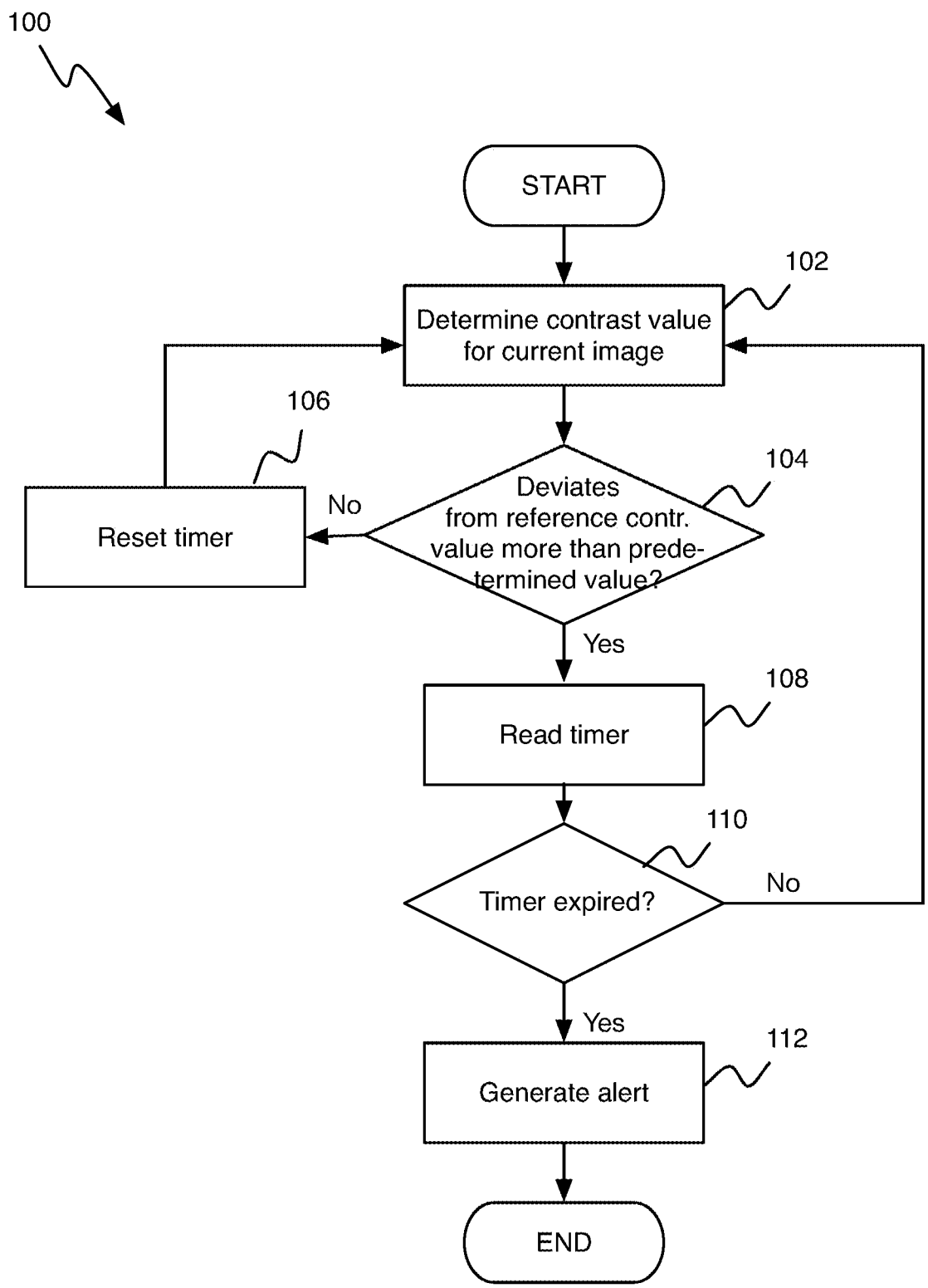
FIG. 1 is a flowchart depicting a process for detecting a problem with a thermal camera, in accordance with one embodiment.

As was described above, one goal with the various embodiments is to be able to automatically detect a problem with a thermal camera. At a general level, the various embodiments work as follows.

The contrast value in an image (i.e., the degree of difference between the highest and lowest intensity parts of an image) captured by the thermal camera is measured over time and is compared to a contrast value threshold that represents a correctly installed and correctly functioning thermal camera. If the contrast values of the captured images fall below the contrast value threshold and remain below the contrast value threshold for a predetermined time, this might indicate that the thermal camera has been tampered with or suffered some sort of degradation, and an operator may be alerted to further investigate the possible problem. Various embodiments will now be described in greater detail by way of example and with reference to the drawings. First, however, a brief overview of thermal cameras will be presented.

A conventional network camera operating in the visible range of the electromagnetic spectrum and a thermal network camera are similar in many aspects, such as compression and the networking features, availability of different form factors for use in different environments and situations, etc. However, two things differ substantially: the lens and the sensor.

Because regular glass blocks thermal radiation, regular glass-based optics and lenses cannot be used in thermal cameras. Currently, germanium is the most commonly used material for thermal camera optics. Germanium, which is an expensive metalloid that is chemically similar to tin and silicon, blocks visible light while letting through the IR light. There are also alternatives to using pure germanium. For example, some lenses are made of a germanium-based material called chalcogenide glass, which allows a wider spectrum of IR light to pass through.

The sensor in a thermal camera is an array of thousands of detectors that are sensitive to thermal infrared (IR) radiation. The detectors used for thermal imaging can be broadly divided into two types: cooled and uncooled IR sensors. Uncooled IR image sensors are smaller and built with fewer moving parts, which makes them less expensive than their cooled counterparts. Cameras with cooled sensors generally need to be serviced, and also have the cooling medium refilled every 8,000-10,000 hours. Most commercially available thermal cameras use uncooled IR sensors, and therefore the description herein will refer to such sensors. However, it should be noted that the techniques in accordance with the various embodiments herein can also be applied to cameras that have cooled sensors, and that the claims should not be construed as being limited only to thermal cameras with uncooled sensors.

Uncooled sensors typically operate in the Long-wave Infrared (LWIR) band, at about 8-15 micrometers wavelength, and can be based on a variety of materials that all offer unique benefits. One common design is based on microbolometer technology, which are well known to those having ordinary skill in the art. Microbolometers generally make up an array of pixels, each constructed from a microbolometer including thermo-sensing material whose electrical resistivity changes as it absorbs incident IR radiation. The IR-absorbing material is connected to a read-out circuit by means of electrodes and a reflector is arranged inside the IR-absorbing material for reflecting back IR radiation passing through the absorbing material. In order to reduce the influence of convection on the heat absorbing properties of the pixels, the microbolometer is encapsulated in vacuum. A getter material may be deposited in the microbolometer for reacting with or adsorbing gas molecules released inside the microbolometer, thereby extending the longevity of the vacuum. IR radiation incident on the microbolometer changes the resistivity of the IR-absorbing material, and the change is transferred to the read-out circuit for processing. The change in resistivity is translated into a temperature of the part of the captured scene from which the IR radiation originated.

Resolutions are generally lower for thermal cameras than for conventional network cameras. This is mostly due to the more expensive sensor technology involved in thermal imaging. The pixels are larger, which affects the sensor size and the cost of materials and production. Currently, typical resolutions for thermal cameras range from 160×120 to high resolutions of 640×480 (VGA), though even higher and lower resolutions are available.

The resolution of the thermal camera is also connected to its ability to detect an object. The resolution required to detect an object is stated in pixels and determined by means of the so-called "Johnson's criteria." These criteria provide a 50% probability of an observer distinguishing an object at the specified level, and for a thermal sensor, the temperature difference between the object and its background needs to be at least 2° C. (3.6° F.). In one implementation, the levels of Johnson's criteria used for thermal network cameras are as follows:

At least 1.5 pixels are needed for detection (i.e., the observer can see that an object is present).
At least 6 pixels are needed for recognition (i.e., the observer can distinguish the object, for example, a person in front of a fence).
At least 12 pixels are needed for identification (i.e., the observer can distinguish an object and object characteristics, for example, a person holding a crowbar in his hand).

Johnson's criteria were developed under the assumption that visible information is processed by a human observer. If information is instead processed by an application algorithm, there will be specific requirements about the number of pixels needed on the target for reliable operation. All video analytics software algorithms need to work with a certain number of pixels, but the exact number of pixels may vary. Even if a human observer is able to detect the object, the application algorithm often needs a larger number of pixels at a given detection range to work properly.

An analogous type of criteria can be used to determine a reference contrast for an image, against which measured contrast values can be compared, as will now be discussed in greater detail with reference to FIG. 1, which shows a flowchart of a method 100 for detecting a problem with a thermal camera, in accordance with one embodiment. As can be seen in FIG. 1, the method 100 starts by determining a contrast value for a current image that is captured by the thermal camera, step 102. The contrast value can be determined in a number of ways that are familiar to those of ordinary skill in the art. A few examples will be given here along with their respective advantages and drawbacks. It is to be understood that various methods may be better or worse to use, based on the specific circumstances at hand, and that what specific algorithm to use under what conditions is a choice to be made by the skilled artisan.

One method for determining contrast is to use Michelson Contrast, which is a global measure of the contrast in an image. The Michelson Contrast function does not catch any features like sharp edges in the image and instead operates only on the minimum and the maximum pixel intensity in the image. The larger difference between the minimum and maximum pixel intensities in the image, the greater output of the function.

Another method for determining contrast is to use RMS (Root Mean Square) contrast, which uses the root-mean-square of the image as the definition for contrast. The RMS formula takes into account not only the pixel intensities, but also the width and height of the image. This measurement is also global, but takes more pixels into account than just the maximum and the minimum pixel intensity values in the image. A high intensity variance among the pixels contributes to higher contrast.

Yet another method for determining contrast is to use a Sobel filter. The Sobel filter is a measurement which is typically used as an edge detection algorithm rather than a contrast measurement. It works by sweeping two separate convolution kernels over the image, one for edge detection along the x-axis and the other for edge detection along the y-axis. Since the Sobel operator is good at detecting sharp edges in the image, it can be seen as a measure of contrast as high contrast is often perceived when an image has sharp edges. This is useful to find image samples where the lens is unfocused because there are no sharp edges in the image.

The output of the Sobel algorithm is an entire image, which means that the Sobel filtering must be followed by some kind of mapping of the image down to a single value that subsequently can be used for comparison purposes. This can be done in several ways. One straightforward way to measure the contrast is to pick the maximum value in the output Sobel image. This is cheap in computation; however, a single sharp edge in the image will be sufficient to enough to classify the image as having high contrast, which may not always be desirable. Another way is to make a measurement which takes all pixels into account, and measure the contrast based on how much the pixels in the Sobel image deviate from zero. Yet another way to reduce the Sobel to a single contrast measure value is to use the mean of the output image. This takes all pixels into account and allows all edges, both in number and sharpness, to contribute to the output value. It should be noted that these are merely a few representative techniques, and there are many other variations that fall within the capabilities of those having ordinary skill in the art.

After determining the contrast, a determination is made as to whether the contrast value deviates from a reference contrast value by more than a predetermined contrast value, step 104. In some implementations, the predetermined contrast value can be a fixed value that is determined based on the Johnson criteria, as discussed above. That is, there can be one predetermined contrast value for detection, there can be another one for recognition and yet another for identification, and based on the particular situation and a particular predetermined contrast value can be used.

In some implementations, the predetermined contrast value may not be determined using the Johnson criteria. Instead, it may be determined experimentally during setup of the camera, for example, by measuring predetermined contrast values that are required for detection, recognition and identification, respectively, of objects or people against a homogeneous background, and using these measured values as predetermined contrast values.

In yet other implementations, the predetermined contrast value can be simulated by defocusing or otherwise degrading a monitored scene until the scene is deemed visually by an operator to be too "fuzzy" or to have too low quality, and then base the predetermined contrast values based on such a simulation.

Figure 2:
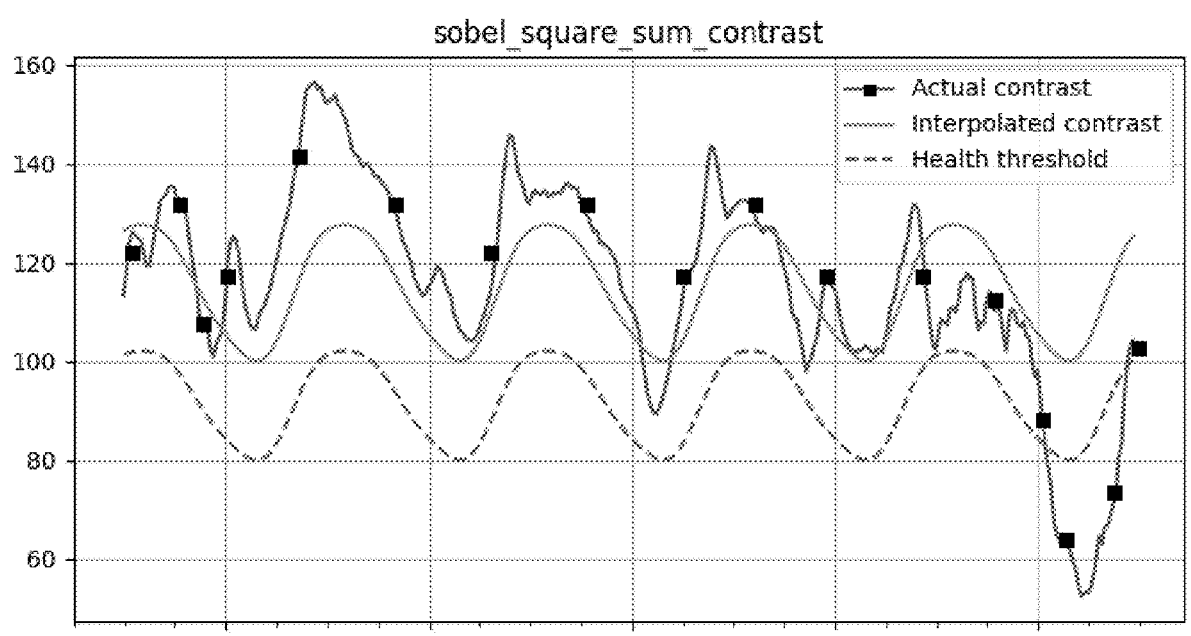
FIG. 2 is a schematic diagram showing time varying predetermined contrast values and actual contrast value measurements, in accordance with one embodiment.
Figure 3:
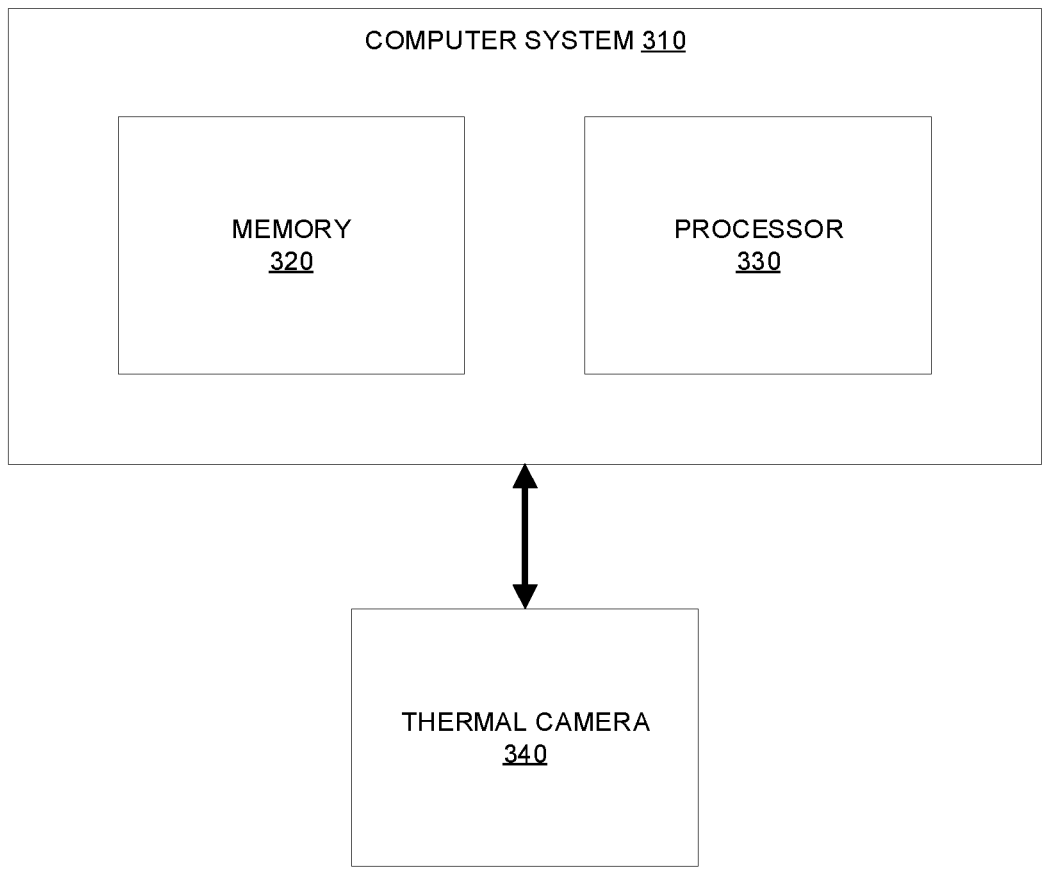
FIG. 3 is a block diagram depicting an example system for detecting a problem with a thermal camera.

It should be noted that the predetermined contrast value can also vary with time, for example, based on the time of day, the time of year, etc., and based on the weather. This time variable value can be determined, for example, by measuring contrast values over a period of time and using a machine learning algorithm to define what would be a "normal" contrast value for a given set of circumstances, and then use that "normal value" as the contrast reference value. FIG. 2 shows schematically how actual contrast measurements (top curve) vary over time. These measurements can be interpolated to a curve (middle curve) that describes the expected variation over time. Finally, a varying predetermined threshold value can be set (lower, dashed curve), for example an 80% of the values of the interpolated curve, that can be used as the predetermined threshold value at any given time.

If the measured contrast value falls within the acceptable range, a timer is reset, step 106, and the process goes back to step 102 and continues as explained above with measuring a contrast value for another image. The frequency by which the contrast measurements occurs can vary, but in some implementations a contrast measurement is typically made approximately every 10 minutes.

However, if the measured contrast value falls outside the acceptable range, a timer is read, step 108, and the timer value is then examined to see if the timer has expired in step 110. If the timer has not expired, the process returns to step 102 as described above. What this effectively means is that the first time the contrast value of a measured image goes below the predetermined contrast value, the time at which this occurs is noted. Then as contrast values are determined for new images and these contrast values (or at least a significant majority of them) keep lying below the threshold value the method keeps track of how long this has been going on. When a certain amount of time has passed (i.e., the timer has expired) and the contrast values still lie under the threshold value, an alert is generated, step 112, which ends the process. The expiration time for the timer can be determined by a user, but is typically in the range of one to three days for a camera that is placed in an outdoor environment, and typically shorter for a camera that is placed in an indoor environment. However, it should be noted that these values are highly dependent on the context, and will in most situations have to be adjusted by an operator of the camera to fit the particular situation at hand.

The alert generated in step 112, can for example be an alert to a camera operator that the thermal camera is suffering some kind of problem and needs to be examined manually, or could be an alert to a maintenance team to run some kind of test sequence on the camera, or could be an instruction to switch over to a different camera covering the same scene until the problem has been resolved. Many variations can be envisioned by those having ordinary skill in the art. The alert may be presented to the operator in any of several possible ways, such as through an on screen message in a video management system, a text message to the operator's mobile phone, or an audio message via a speaker in a control center.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present teachings may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present teachings are described with reference to flowchart illustrations and/or block diagrams of methods, apparatus (systems) and computer program products according to embodiments. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments set forth herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. Thus, many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a problem with a thermal camera, comprising:
    determining a current contrast value for the thermal camera;
    determining whether the current contrast value deviates from a reference contrast value by more than a predetermined value;
    in response to determining that the current contrast value deviates from the reference contrast value by more than a predetermined value, starting a timer; and
    in response to determining that the current contrast value deviates from the reference contrast value by more than a predetermined value and for more than a predetermined period of time since the timer was started, providing an indication of a problem with the thermal camera.

2. The method of claim 1, wherein the problem is one of: the thermal camera having been tampered with, the thermal camera having been redirected, and the lens of the thermal camera being affected in a way that causes transmission loss.

3. The method of claim 1, wherein the reference contrast value and the current contrast value are determined using one of: a contrast value representative of a Sobel image obtained by applying a Sobel algorithm to an image captured by the thermal camera, a Michelson contrast algorithm applied to the image captured by the thermal camera, and an image entropy algorithm applied to the image captured by the thermal camera.

4. The method of claim 1, wherein the predetermined value is based on a Johnson criterion pertaining to one or more of: detection, recognition and identification of an object having a temperature that differs from the temperature of a homogenous background by at least 2° C., and wherein at least 1.5 pixels are used for detection of the object, at least 6 pixels are used for recognition of the object and at least 12 pixels are used for identification of the object.

5. The method of claim 1, wherein the reference contrast value is generated through applying a machine learning process on measured contrast values over a period of time.

6. The method of claim 1, wherein providing an indication of a problem further comprises:
    starting a timer in response to an earliest determination that the current contrast value deviates from the reference contrast value by more than the predetermined value;
    at regular time intervals, repeating the determination of a current contrast value and the determination of whether the current contrast value deviates from the reference contrast value; and
    in response to detecting that the current contrast values remain deviant from the reference contrast value by more than the predetermined value and for more than a predetermined period since the timer was started, providing the indication of a problem related to the thermal camera.

7. The method of claim 6, wherein the regular time intervals range from approximately one to three days.

8. A system for detecting a problem with a thermal camera, comprising:
    a memory; and
    a processor,
    wherein the memory contains instructions that when executed by the processor causes the processor to perform a method that includes:
        determining a current contrast value for the thermal camera;
        determining whether the current contrast value deviates from a reference contrast value by more than a predetermined value;

in response to determining that the current contrast value deviates from the reference contrast value by more than a predetermined value, starting a timer; and in response to determining that the current contrast value deviates from the reference contrast value by more than a predetermined value and for more than a predetermined period of time since the timer was started, providing an indication of a problem with the thermal camera.

9. A thermal camera including a system as described in claim 8.

10. A non-transitory computer readable storage medium having program instructions embodied therewith, the program instructions being executable by a processor to perform a method for detecting a problem with a thermal camera, the comprising method comprising:

determining a current contrast value for the thermal camera;

determining whether the current contrast value deviates from a reference contrast value by more than a predetermined value;

in response to determining that the current contrast value deviates from the reference contrast value by more than a predetermined value, starting a timer; and in response to determining that the current contrast value deviates from the reference contrast value by more than a predetermined value and for more than a predetermined period of time since the timer was started, providing an indication of a problem with the thermal camera.

* * * * *